US007675875B2

(12) United States Patent
Lim (10) Patent No.: US 7,675,875 B2
(45) Date of Patent: Mar. 9, 2010

(54) DATA LOSS CONTROL IN A PUSH TO COMMUNICATE NETWORK

(75) Inventor: Guk-Chan Lim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1105 days.

(21) Appl. No.: 11/322,292

(22) Filed: Dec. 29, 2005

(65) Prior Publication Data

US 2006/0171338 A1 Aug. 3, 2006

(30) Foreign Application Priority Data

Dec. 29, 2004 (KR) ...................... 10-2004-0115558

(51) Int. Cl.
*H04B 7/005* (2006.01)
*H04L 12/54* (2006.01)
*H04L 12/28* (2006.01)

(52) U.S. Cl. .................. 370/278; 370/428; 370/394

(58) Field of Classification Search ................. 370/216, 370/218, 242, 276, 282, 320, 328, 329, 428, 370/429, 412; 455/67.11, 522, 69, 70, 518, 455/463

See application file for complete search history.

(56) References Cited

U.S. PATENT DOCUMENTS

| | | | |
|---|---|---|---|
| 5,610,920 A | 3/1997 | Doll et al. | |
| 6,665,283 B2 * | 12/2003 | Harris et al. | 370/333 |
| 6,751,468 B1 | 6/2004 | Heubel et al. | |
| 7,079,857 B2 * | 7/2006 | Maggenti et al. | 370/447 |
| 7,145,889 B1 * | 12/2006 | Zhang et al. | 370/329 |
| 7,260,087 B2 * | 8/2007 | Bao et al. | 370/352 |
| 2004/0196826 A1 | 10/2004 | Bao et al. | |

FOREIGN PATENT DOCUMENTS

| | | |
|---|---|---|
| JP | 57-088346 | 11/1980 |
| JP | 64-065932 | 3/1989 |
| JP | 3014323 | 1/1991 |
| JP | 8298467 | 11/1996 |

OTHER PUBLICATIONS

Whitehill E.A.: "Use of end-to-end acknowledgment in Mil-Std-188-220A extended networks"; Tactical Communications Conference, 1996; Proceedings of the 1996 Fort Wayne, In. USA Apr. 30-May 2, 1996, New York, NY, USA, IEEE, US, Apr. 30, 1996;pp. 495-502, XP010201886; ISBN: 0-7803-3658-5 *p. 496*.

(Continued)

*Primary Examiner*—Hanh Nguyen
(74) *Attorney, Agent, or Firm*—Lee, Hong, Degerman, Kang & Waimey (57) ABSTRACT

An audio data retransmission method in a push to communicate (PTx) terminal for transmitting data by pressing a PTx key is provided. The method comprises transmitting data using a transmitting PTx terminal; storing the data in a buffer; and retransmitting the data when receiver requests retransmission due to a loss in communications.

22 Claims, 5 Drawing Sheets

OTHER PUBLICATIONS

Baron S., et al.: "Combat Net Radio (CNR) Protocols: A Means for Battlefield Digitization"; Military Communications Conference, 1994; Milcom '94; Conference Record, 1994 IEEE Fort Monmouth, NJ, USA Oct. 2-5, 1994 New York, NY, USA, IEEE, Us; Oct. 2, 1994, pp. 210-214, XP01014789; ISBN: 0-7803-1828-5 *pp. 210-212*.

"Universal Mobile Telecommunications System (UMTS); 3GPP enablers for Open Mobile Alliance (OMA) Push-to-talk over Cellular (PoC) services; Stage 2 (3GPP TR 23.979 version 6.0.0 Release 6);ETSI TR 123 979"; ETSI Standards, European Telecommunications Standards Institute, Sophio-Antipo, FR, vol. 3-SA2, No. V600, Dec. 2004, XP014027164; ISSN: 0000-0001; *the whole document*.

* cited by examiner

DATA LOSS CONTROL IN A PUSH TO COMMUNICATE NETWORK

CROSS REFERENCE TO RELATED APPLICATIONS

Pursuant to 35 U.S.C. § 119(a), this application claims the benefit of earlier filing date and right of priority to Korean Patent Application No. 115558/2004, filed on Dec. 29, 2004, the content of which is hereby incorporated by reference herein in its entirety.

Field of Invention

The invention relates to a push to communicate (PTx) or push to talk (PTT) communication device or terminal, and particularly to an audio data retransmission method in a PTx communication network.

Background

In general, a push to talk (PTT) terminal refers to a terminal that allows real-time communication between two at least two parties (e.g., from a transmitting party to a receiving party). The transmitting party presses a certain key of a transmitting PTT terminal before starting to speak. The transmitting PTT terminal then transmits the respective audio data to one or more receiving PTT terminals.

The transmitting PTT terminal will be able to receive audio data or maintain a stand-by mode when the PTT key is not pressed. The PTT terminal performs one-to-one or one-to-many communication, and more particularly, operates in half-duplex mode. The PTT terminal, typically, transmits audio data by grouping and transmitting the audio data in packets over a CDMA or GSM network. The corresponding audio data is transferred to a destination by using VoIP (Voice Over Internet Protocol).

A user can input audio data through a microphone of the transmitting PTT terminal when a PTT key is pressed. An inputted audio signal is converted into a digital signal and an appropriate transmission format prior to transmission.

A receiving PTT terminal receives and processes the digital signal to reproduce the associated audio data through a speaker of the receiving PTT terminal. If the receiving party does not receive the transmitted audio data (i.e., the transmitted audio data is lost) due to degradation of RF reception signal or the base station's transmission inefficiencies, the receiving PTT terminal requests from the transmitting PTT terminal to retransmit the lost audio data.

In this case, the transmitting party will need to re-input the audio data through the microphone to retransmit the lost audio data. If the receiving party continuously fails to receive the audio data, the transmitting party must inconveniently repeat the above retransmission process over and over again.

A solution to the above problem is needed.

SUMMARY

In accordance with one aspect of the invention an audio data retransmission method in a PTx (push to communicate) communication network is provided. To achieve these and other advantages and in accordance with the purpose of the invention, as embodied and broadly described herein, a data retransmission method in a push to communicate (PTx) communications network for transmitting data from a transmitting PTx terminal to a receiving PTx terminal is provided.

The method comprises transmitting first data from a transmitting PTx terminal to a receiving PTx terminal; storing the first data; and retransmitting the first data in response to the receiving PTx terminal requesting retransmission of the first data.

In one embodiment, the first data is stored in a buffer. The buffer is implemented as at least one of an internal memory and an external memory in the transmitting PTx terminal. The first data may be outputted through a speaker in the retransmitting process and deleted when a PTx key of the transmitting PTx terminal is pressed to transmit second data. A PTx key is implemented on the transmitting PTx terminal, such that interacting with the PTx key results in transmission of the first data.

In accordance with another embodiment, an audio data retransmission method in a push to communicate (PTx) terminal for transmitting audio data comprises setting an automatic audio retransmission function; storing audio data, to be transmitted to a receiver PTx terminal, in a buffer; and retransmitting the audio data stored in the buffer, in response to the receiver PTx terminal requesting retransmission of the audio data.

In accordance with yet another embodiment, a mobile terminal apparatus that supports a push to communicate (PTx) function is provided. The apparatus comprises a radio frequency unit adapted to communicate radio communication signals; a codec adapted to process audio inputs provided by a user via a PTx function; a memory adapted to store the processed audio inputs; and a microprocessor unit adapted to control said codec to forward the processed audio inputs to said memory for storage after the processed audio inputs are transmitted to another user via said radio frequency unit, the microprocessor unit further adapted to control said radio frequency unit, said codec, and said memory to retransmit the processed audio inputs stored in said memory, if said another user requests retransmission of the processed audio inputs due to a loss in transmission.

In a preferred embodiment, a communication network is configured for supporting a push to communicate (PTx) communication protocol, such that the communication network comprises a plurality of base stations in communication with a plurality of PTx terminals, wherein a transmitting PTx terminal requests a talk burst grant from a PTx server for transmitting audio data to a receiving PTx terminal, wherein the transmitting PTx terminal stores the audio data in a storage medium when the request for talk burst grant is submitted, so that if the receiving PTx terminal fails to receive the audio data, the stored audio data is retransmitted.

A data communication protocol for a push to communicate (PTx) mobile communications network may comprise detecting a floor grant for data communication between a transmitting PTx terminal and a receiving PTx terminal; determining whether a failure has occurred in transmitting first data to the receiving PTx terminal; and notifying the transmitting PTx terminal of failure in data transmission, wherein the transmitting PTx terminal retransmits the first data in response to receiving a failure notice, and wherein the first data is stored in a storage medium of the transmitting PTx terminal.

The failure in transmitting the first data is determined, when a threshold time has lapsed from time of the floor grant, or when the transmitting PTx terminal does not receive an acknowledgement of receipt from the receiving PTx terminal. In alternative embodiments, a failure is determined when a receiving PTx terminal receives data from a transmitting PTx terminal, but the receiving PTx terminal can't hear or understand the data, due to noise or other transmission problems.

When a failure is determined, the transmitting PTx terminal automatically retransmits the first data, in certain embodiments.

In another embodiment, a push to communicate (PTx) terminal comprises a transmitting unit for requesting a floor grant for data communication between a transmitting PTx terminal and a receiving PTx terminal; memory for storing the first data in a storage medium of the transmitting PTx terminal; and a processing unit for determining a communication failure, if a failure occurs in transmitting first data to the receiving PTx terminal; wherein in response to determining a communication failure, the transmitting PTx terminal retransmits the first data.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

A preferred embodiment is directed to a method for retransmission of lost audio data in a push to communicate (PTx) communication network. In a PTx communication network, a transmitting communication device can single or multicast audio data to one or more devices in the network. After a PTx key of a PTx communication device is pressed, a user may input audio data. The inputted audio data is temporarily stored, so that the stored data can be retransmitted in case the first transmission is unsuccessful.

Figure 1:
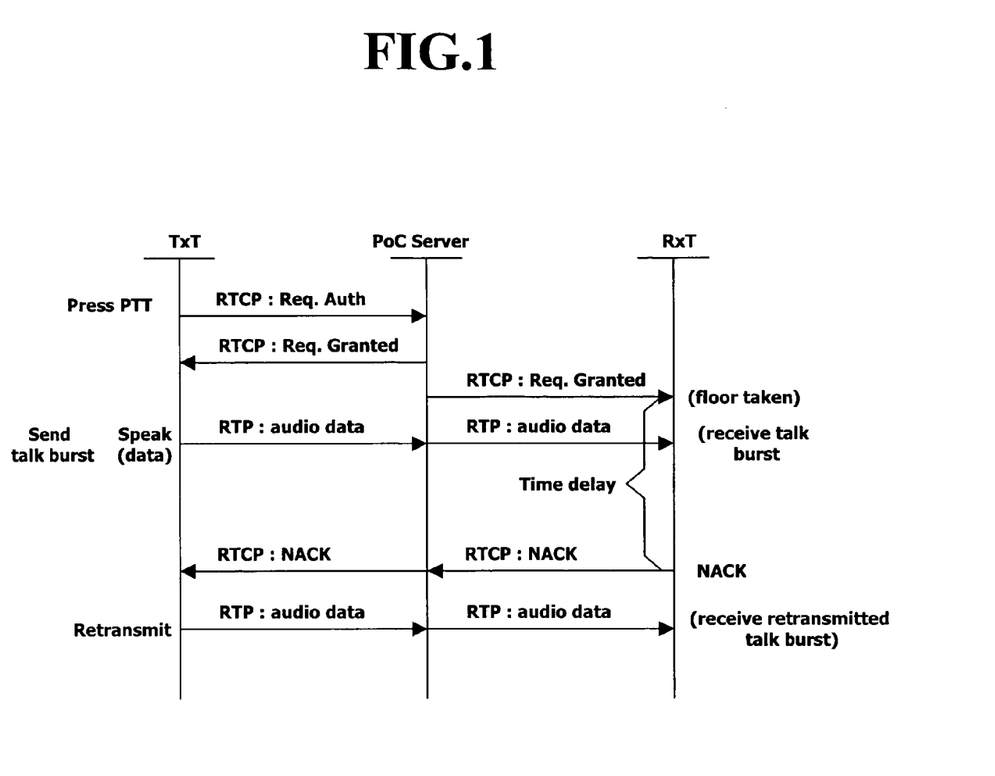
FIG. 1 is a state diagram of data communicated in a push to communicate (PTx) communication network, in accordance with one embodiment of the invention.

Referring to FIG. 1, a PTx communication session may be established between a transmitting PTx terminal and a receiving PTx terminal over RTP (Real-time Transport Protocol). RTP is an IP (internet protocol) that supports real-time transmission of voice and video. RTP is widely used for IP telephony and audio and video streaming. An RTP packet is transported on top of UDP (User Datagram Protocol), and includes time stamping and synchronization information in its header for proper reassembly at the receiving end.

In accordance with one embodiment, a transmitting PTx terminal submits a floor request (i.e., request for talk burst authority) over the RTCP (Realtime Control Protocol). The request is received by a PoC (push to talk over cellular) or PTx server which can grant the floor request. If the request is granted, a talk burst grant is transferred over the RTCP to the transmitting PTx terminal.

In a preferred embodiment, the receiving PTx terminal is also notified of the grant of the request and thus waits to receive audio data from the transmitting PTx terminal. Once the transmitting PTx terminal has the floor, the transmitting party may input audio data (e.g., by way of speaking). The inputted audio data is then transmitted over the RTP to the receiving PTx terminal by way of the PoC server, for example.

If the transmitted audio data is not received by the receiving PTx terminal after a threshold time has lapsed (e.g., data is lost), then the receiving PTx terminal transfers a failure notification (e.g., NACK) to the transmitting PTx terminal over the RTCP. Once the transmitting PTx terminal receives the failure notification, the lost data is retransmitted as provided in further detail below.

It should be noted that a fault in data transmission can be detected in different manners. Thus, in alternative embodiments, the failure in transmission or receipt of faulty data may be detected by way of the receiving PTx terminal failing to send an acknowledge (e.g., ACK) to the transmitting PTx terminal. In alternative embodiments, a failure is determined when a receiving PTx terminal receives data from a transmitting PTx terminal, but the receiving PTx terminal can't hear or understand the data, due to noise or other transmission problems.

Figure 2:
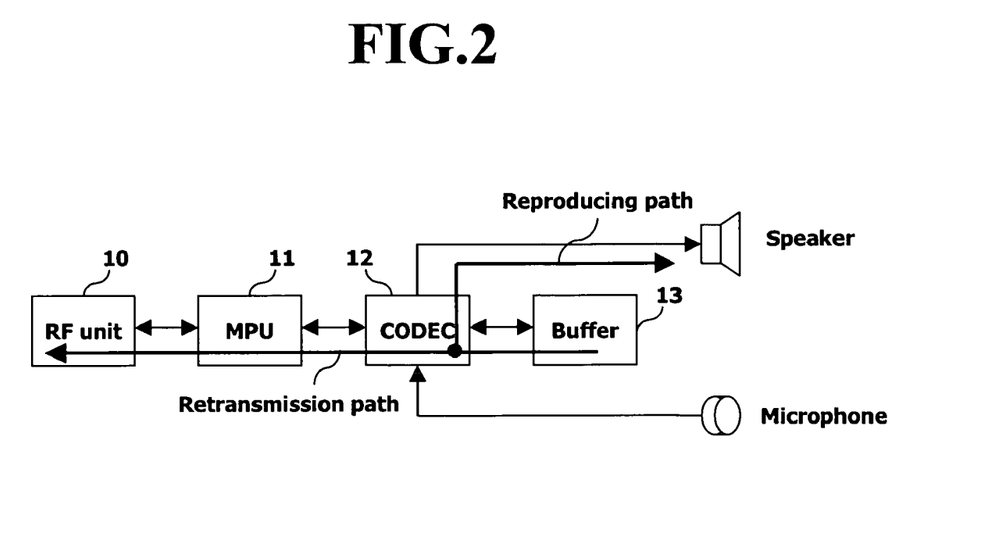
FIG. 2 is a block diagram of a PTx terminal according to a preferred embodiment.

Referring to FIG. 2, a PTx terminal according to a preferred embodiment comprises a radio frequency (RF) unit 10, a MPU (Microprocessor Unit) 11, a codec (Coder and Decoder) 2, a speaker, a microphone and a buffer 13. The RF unit 10 is for performing radio communications. The MPU 11 is for performing general control operations.

The codec 12 is for converting an analog audio signal inputted through a microphone into a digital audio signal which is then provided to the MPU 11 for processing. In a reverse direction, the codec 12 converts a digital audio signal received through the MPU 11 into an analog audio signal for output through the speaker.

The buffer 13 can be implemented as internal or external memory. The buffer 13, in one embodiment, is connected to the codec 12 and provides for temporary storage of audio data, in case the data is lost during transmission.

A dedicated user interface (e.g., a PTx key) may be provided on the PTx terminal, so that a user can activate a PTx feature of the PTx terminal by, for example, pressing a related key. In alternative embodiments, this function may be activated by selecting one of the keys provided on the keypad of the PTx terminal or selecting from a graphic user interface menu displayed on the PTx terminal's display screen.

Figure 3:
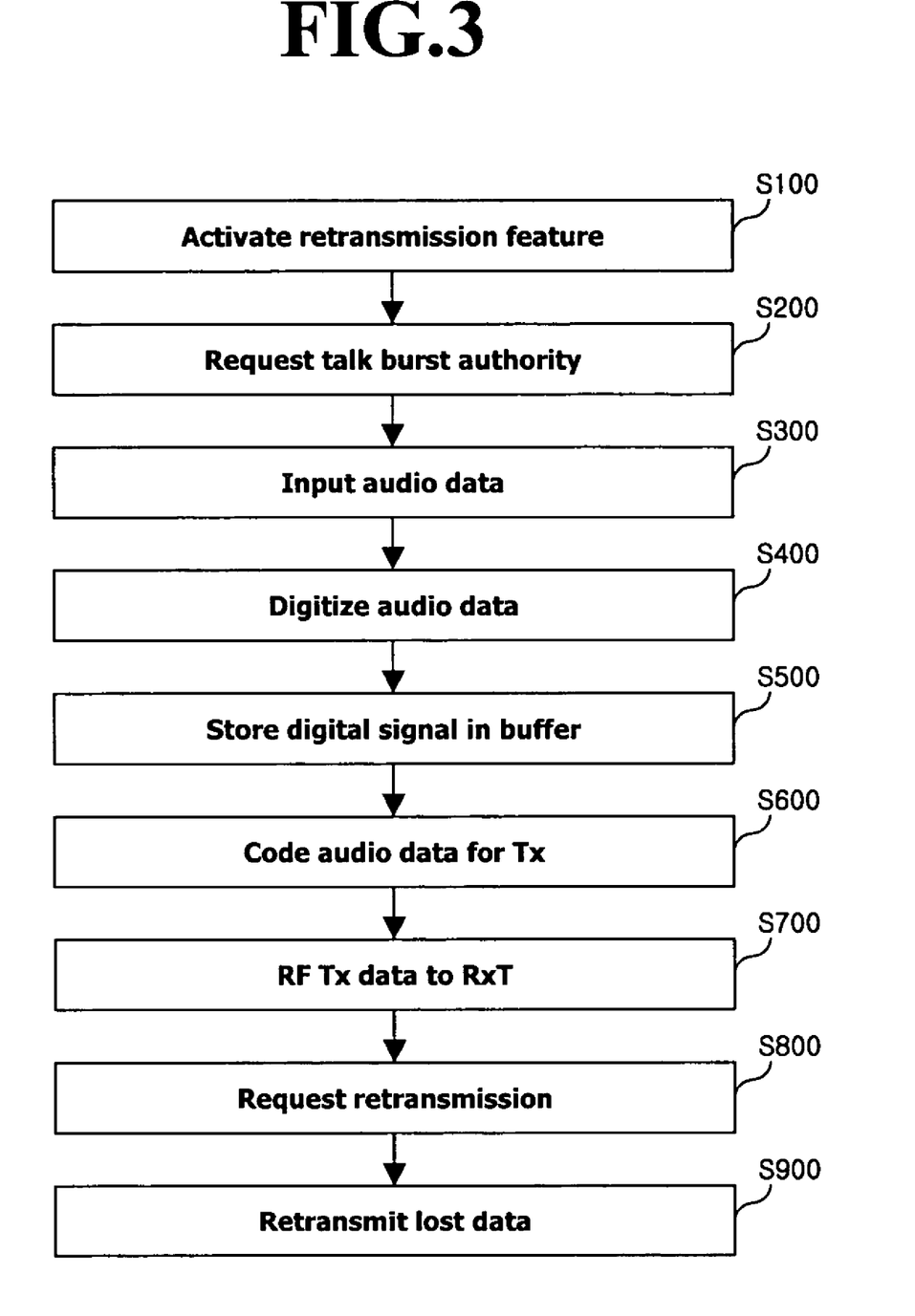
FIG. 3 is a flow diagram of an exemplary method of operating a PTx terminal for retransmitting lost data, in accordance with the preferred embodiment.

Referring to FIG. 3, to activate an automatic retransmission feature of the PTx terminal, a transmitting party may interact with a transmitting terminal's user interface to activate the respective retransmission Feature (S100). Once this feature is activated, the transmitting party may press the PTx key to request talk burst authority (i.e., to receive permission to transmit audio data from a base station) (S200).

After pressing the PTx key, the transmitting party may input audio data through the microphone of the PTx terminal (S300). The inputted audio data is converted into a digital signal in the codec 12 (S400). The corresponding digital signal is stored in the buffer 13 (S500) and converted into a transmission format by the MPU 11 (S600) for RF transmission via the RF unit 10. The RF unit 10 then transmits the data to a receiving PTx terminal (S700).

If the data is lost during the transmission (i.e., is not received by the receiving PTx terminal) a request for retransmission is submitted from the receiving PTx terminal to the sending PTx terminal (S800).

The request for retransmission, in a preferred embodiment, is automatically generated by the receiving PTx terminal. In an alternative embodiment, the receiving party has the option of manually requesting the lost data to be retransmitted (e.g., verbal request, press of one or more buttons, select from a graphic menu, etc.). When the transmitting PTx terminal receives the retransmission request, it then retransmits the audio data stored in the buffer 13 (S900).

In some embodiments, the retransmitted audio data is reproduced via the transmitting terminal's speaker to enable the transmitting party to listen to the audio so that he knows retransmission is in process. In alternative embodiments, the retransmission takes place silently.

In yet another embodiment, the retransmission may not take place automatically. Instead, the transmitting party may be notified of the failure of the initial transmission, by way of an interactive message (e.g., audio alert, graphic alert, or a combination of the two). In this embodiment, the transmitting party will have the option of interacting with the transmitting terminal to cause the stored audio data in the buffer 13 to be retransmitted manually (e.g., by pressing a button for a predetermined length of time or a predetermined sequence).

In is noteworthy that while the present disclosure is directed by way of example to a PTx terminal and a PTx communication network, the principals and features disclosed herein may be applied to other types of communication devices or terminals operating over a PTT, CDMA, TDMA, FDMA, WCDMA or GSM network, or other functionally or structurally equivalent mobile communication systems having one-to-one or one-to-many broadcasting features. Further, in certain embodiments, instead of audio data other types of data (e.g., video, text, multimedia) may be transmitted.

Figure 4:
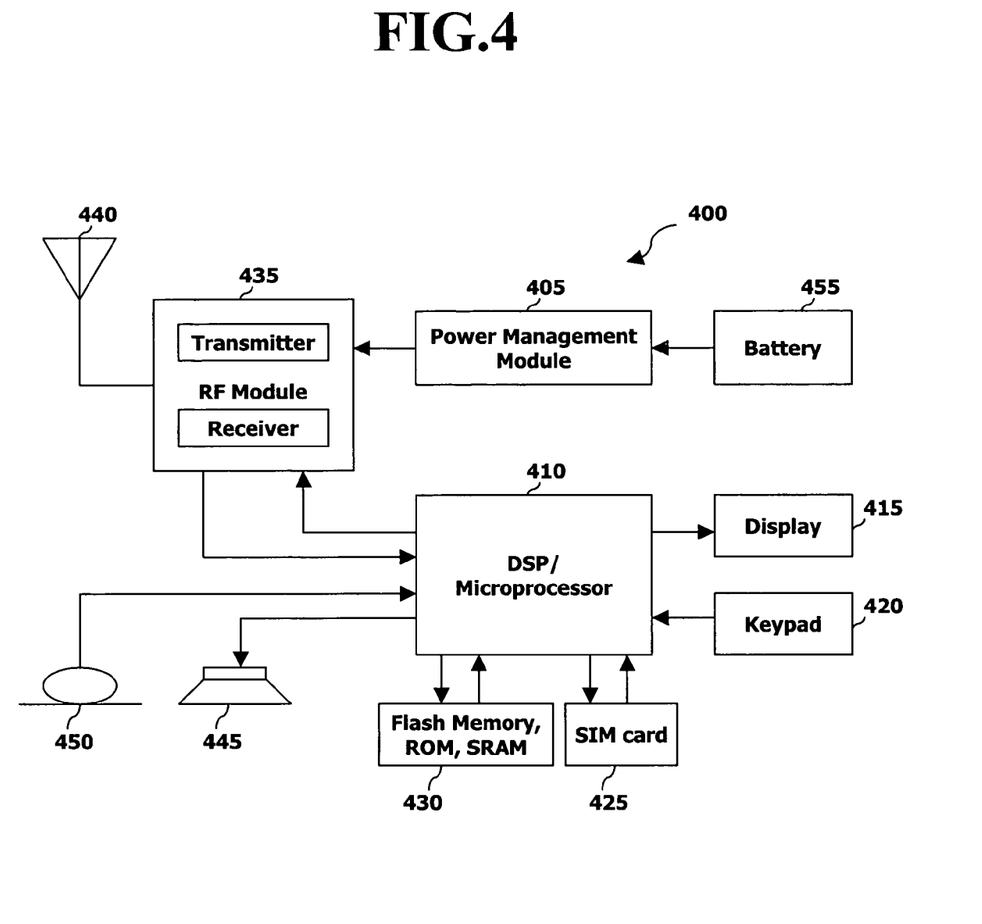
FIG. 4 is a block diagram of an exemplary PTx terminal in accordance with one embodiment.

Referring to FIG. 4, a block diagram of an exemplary embodiment of a PTx terminal 400 is illustrated. The PTx terminal 400 comprises a processing unit 410 such as a microprocessor or digital signal processor, an RF module 435, a power management module 406, an antenna 440, a battery 455, a display 415, a keypad 420, a storage unit 430 such as flash memory, ROM or SRAM, a speaker 445 and a microphone 450.

A user enters instructional information (e.g., request for talk burst, phone number, etc.) by pushing the buttons of a keypad 420 or by voice activation using the microphone 450. The processing unit 410 receives and processes the instructional information to perform the appropriate function, such as to dial the telephone number. Operational data may be retrieved from the storage unit 430 to perform the function. Furthermore, the processing unit 410 may display the instructional and operational information on the display 415 for the user's reference and convenience.

The processing unit 410 issues instructional information to the RF module 435 to initiate communication (e.g., transmit radio signals comprising voice communication data). The RF module 435 comprises a receiver and a transmitter to receive and transmit radio signals, respectively. The antenna 440 facilitates the transmission and reception of radio signals. Upon receiving radio signals, the RF module 435 may forward and convert the signals to baseband frequency for processing by the processing unit 410. The processed signals would be transformed into audible or readable information outputted via the speaker 450, for example.

The processing unit 410 is adapted to store message history data of messages received from and messages transmitted to other users in the storage unit 430, receive a conditional request for message history data input by the user, process the conditional request to read message history data corresponding to the conditional request from the storage unit, and output the message history data to the display unit 415. The storage unit 430 is adapted to store message history data of the received messages and the transmitted messages.

Figure 5:
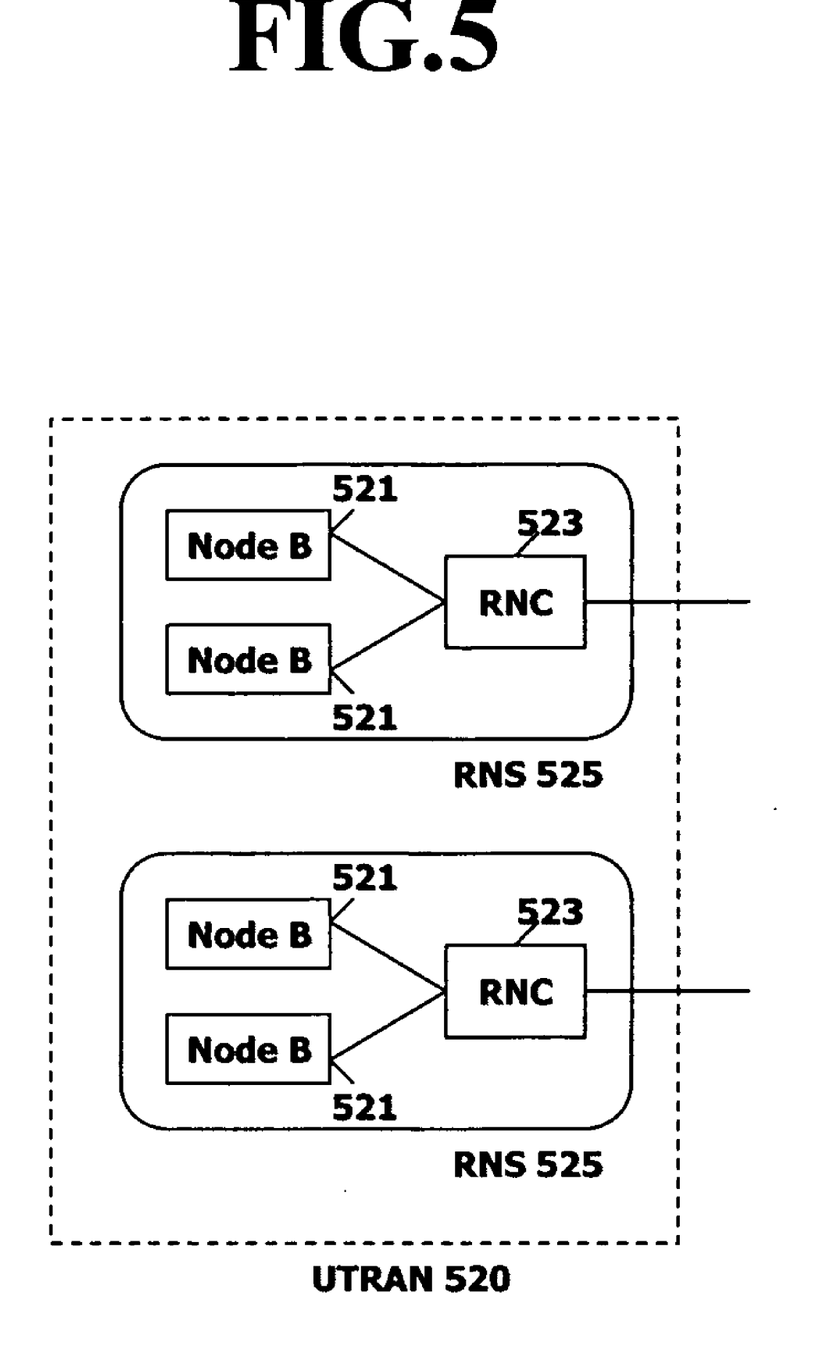
FIG. 5 is a block diagram of an exemplary PTx communication network in which the PTx terminal operates.

FIG. 5 illustrates a block diagram of a PTx communication network having a UTRAN 520 according to a preferred embodiment. The UTRAN 520 comprises one or more radio network sub-systems (RNS) 525. Each RNS 525 comprises a radio network controller (RNC) 523 and a plurality of Node-Bs (base stations) 521 managed by the RNC. The RNC 523 handles the assignment and management of radio resources (e.g., authorizing talk burst requests) and operates as an access point with respect to the core network. Furthermore, the RNC 523 is adapted to perform the methods of the present invention.

The Node-Bs 521 receive information sent by the physical layer of the terminal 410 through an uplink, and transmit data to the terminal through a downlink. The Node-Bs 521 operate as access points, or as a transmitter and receiver, of the UTRAN 520 for the terminal 410.

Although the present invention is described in the context of a mobile communication device, the present invention may also be used in any wired or wireless communication systems using mobile devices, such as PDAs and laptop computers. Moreover, the use of certain terms to describe the present invention should not limit the scope of the present invention to certain type of wireless communication system, such as UMTS. The present invention is also applicable to other wireless communication systems using different air interfaces and/or physical layers, for example, PTx, PTT, TDMA, CDMA, FDMA, WCDMA, etc.

Preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium, hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain of the logic operations may be performed in a different order, modified or removed and still implement preferred embodiments of the present invention. Moreover, steps may be added to the above described logic and still conform to implementations of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A data retransmission method in a push to communicate (PTx) communications network for transmitting data from a transmitting mobile PTx terminal to a receiving PTx terminal, the method comprising:
   transmitting first data from the transmitting mobile PTx terminal to the receiving PTx terminal;
   storing the first data in the transmitting mobile PTx terminal;
   retransmitting from the transmitting mobile PTx terminal the first data in response to the receiving PTx terminal requesting retransmission of the first data; and
   deleting the stored first data after the first data is successfully delivered to the receiving PTx terminal.

2. The method of claim 1, wherein the first data is stored in a buffer.

3. The method of claim 2, wherein the buffer is implemented as at least one of an internal memory and an external memory in the transmitting mobile PTx terminal.

4. The method of claim 1, further comprising outputting the first data through a speaker in the retransmitting process.

5. The method of claim 1, wherein a PTx key is implemented on the transmitting mobile PTx terminal, such that interacting with the PTx key results in transmission of the first data.

6. An audio data retransmission method in a push to communicate (PTx) mobile terminal for transmitting audio data, the method comprising:
   setting an automatic audio retransmission function;
   storing audio data, to be transmitted to a receiver PTx terminal, in a buffer of the PTx mobile terminal;
   retransmitting by the PTx mobile terminal the audio data stored in the buffer, in response to the receiver PTx terminal requesting retransmission of the audio data; and
   deleting the stored audio data after the audio data is successfully delivered to the receiver PTx terminal.

7. The method of claim 6, wherein the PTx mobile terminal comprises a designated PTx key for setting the automatic audio retransmission function.

8. The method of claim 6, wherein the PTx mobile terminal comprises a key on a keypad of the PTx terminal for activating the automatic audio retransmission function.

9. A mobile terminal apparatus that supports a push to communicate (PTx) function, the apparatus comprising:
   a radio frequency unit adapted to communicate radio communication signals;
   a codec adapted to process audio inputs provided by a user via a PTx function;
   a memory adapted to store the processed audio inputs; and
   a microprocessor unit adapted to control said codec to forward the processed audio inputs to said memory for storage after the processed audio inputs are transmitted to another user via said radio frequency unit, the microprocessor unit further adapted to control said radio frequency unit, said codec, and said memory to re-transmit the processed audio inputs stored in said memory, if said another user requests re-transmission of the processed audio inputs due to a loss in transmission,
   wherein the processed audio inputs are temporarily stored in said memory until the user provides subsequent audio inputs via the PTx function.

10. The apparatus of claim 9, wherein the processed audio inputs temporarily stored in said memory are deleted therefrom if said another user does not request re-transmission by the time the user provides the subsequent audio inputs via the PTx function.

11. The apparatus of claim 9, wherein the mobile terminal is a PTx terminal.

12. A communication network configured for supporting a push to communicate (PTx) communication protocol, the communication network comprising a plurality of base stations in communication with a plurality of PTx terminals,
   wherein a transmitting mobile PTx terminal requests a talk burst grant from a PTx server for transmitting audio data to a receiving PTx terminal,
   wherein the transmitting mobile PTx terminal stores the audio data in a storage medium of the transmitting mobile PTx terminal when the request for talk burst grant is submitted, so that if the receiving PTx terminal fails to receive the audio data, the stored audio data is retransmitted, and
   wherein the transmitting mobile PTx terminal deletes the stored audio data after the stored audio data is successfully delivered to the receiving PTx terminal.

13. A data communication protocol for a push to communicate (PTx) mobile communications network comprising:
   detecting a floor grant for data communication between a transmitting mobile PTx terminal and a receiving PTx terminal;
   determining whether a failure has occurred in transmitting data to the receiving PTx terminal;
   transmitting from the receiving PTx terminal a request for retransmission of the data;
   storing the data at the transmitting mobile PTx terminal, upon the occurrence of the failure of the transmitting of the data; and
   deleting the stored data after the data is successfully delivered to the receiving PTx terminal.

14. The data communication protocol of claim 13, wherein the failure in transmitting the data is determined, when a threshold time has lapsed from time of the floor grant.

15. The data communication protocol of claim 13, wherein the failure in transmitting the data is determined, when the transmitting mobile PTx terminal does not receive an acknowledgement of receipt from the receiving PTx terminal.

16. The data communication protocol of claim 13, wherein the transmitting mobile PTx terminal automatically retransmits the data.

17. The data communication protocol of claim 13, wherein the transmitting mobile PTx terminal retransmits the data in response to user interaction with the transmitting mobile PTx terminal.

18. A push to communicate mobile (PTx) terminal comprising:
   a transmitting unit for requesting a floor grant for data communication with a receiving PTx terminal;
   memory for storing data; and
   a processing unit configured to cause the transmitting unit to retransmit the data to the receiving PTx terminal responsive to a request for re-transmission received from the receiving PTx terminal, wherein the processing unit is further configured to cause the memory to delete the stored data after the data is successfully delivered to the receiving PTx terminal.

19. The PTx terminal of claim 18, wherein a failure in transmitting the data is determined, when a threshold time has lapsed from time of the floor grant.

20. The PTx terminal of claim 18, wherein a failure in transmitting the data is determined, when the PTx terminal does not receive an acknowledgement of receipt from the receiving PTx terminal.

21. The PTx terminal of claim 18, wherein the PTx terminal automatically retransmits the data.

22. The PTx terminal of claim 18, wherein the PTx terminal retransmits the data in response to user interaction with the PTx terminal.

* * * * *